United States Patent [19]

Townsend

[11] Patent Number: 5,669,809
[45] Date of Patent: Sep. 23, 1997

[54] SAFETY MEANS FOR POWERED MACHINERY

[76] Inventor: Ray T. Townsend, 3131 Fleur Dr., Des Moines, Iowa 50321

[21] Appl. No.: 651,088

[22] Filed: May 22, 1996

[51] Int. Cl.⁶ .................................. A72B 5/16; F16P 3/00
[52] U.S. Cl. ........................................ 452/125; 307/326
[58] Field of Search ..................................... 452/125, 127; 307/326; 192/35

[56] References Cited

U.S. PATENT DOCUMENTS

| 5,083,973 | 1/1992 | Townsend. |
| 5,122,091 | 6/1992 | Townsend. |
| 5,148,053 | 9/1992 | Dubois, III. |
| 5,160,289 | 11/1992 | Dubois, III. |
| 5,201,684 | 4/1993 | Dubois, III. |
| 5,350,334 | 9/1994 | Holms. |

FOREIGN PATENT DOCUMENTS 3501021  1/1985  Germany.

*Primary Examiner*—Willis Little
*Attorney, Agent, or Firm*—Zarley, McKee, Thomte, Voorhees & Sease

[57] ABSTRACT

A safety glove for use with a meat cutting machine that has a gripping roll and an elongated skinning blade utilizes a glove shell having hollow thumb and finger elements, and a hand compartment. The glove is comprised of a flexible insulation material and has a battery and wireless signal transmitter mounted thereon. First and second wires extend from the battery and the transmitter and these wires are wound around each other and have a layer of insulation on the outer surfaces thereof. The wires are embedded in close proximity to each other within the glove shell by virtue of being wound around each other so that if the glove is cut with an electroconducting instrument, such as the blade of the skinning machine, the wires will be electrically connected together. This occurs either through direct contact of the wires with each other, or by contact of each wire with the skinning blade, whereby the transmitter will be energized and will transmit a wireless signal to a receiver on the machine which is programmed to immediately stop the rotation of the gripper roll. The wires are formed into a plurality of loops which extend around the thumb and finger elements as well as the hand compartmen. t so that if any portion of the glove is cut, the closely related wires will be severed and thereby will become electrically shorted together to complete the electrical circuit to the transmitter.

8 Claims, 3 Drawing Sheets

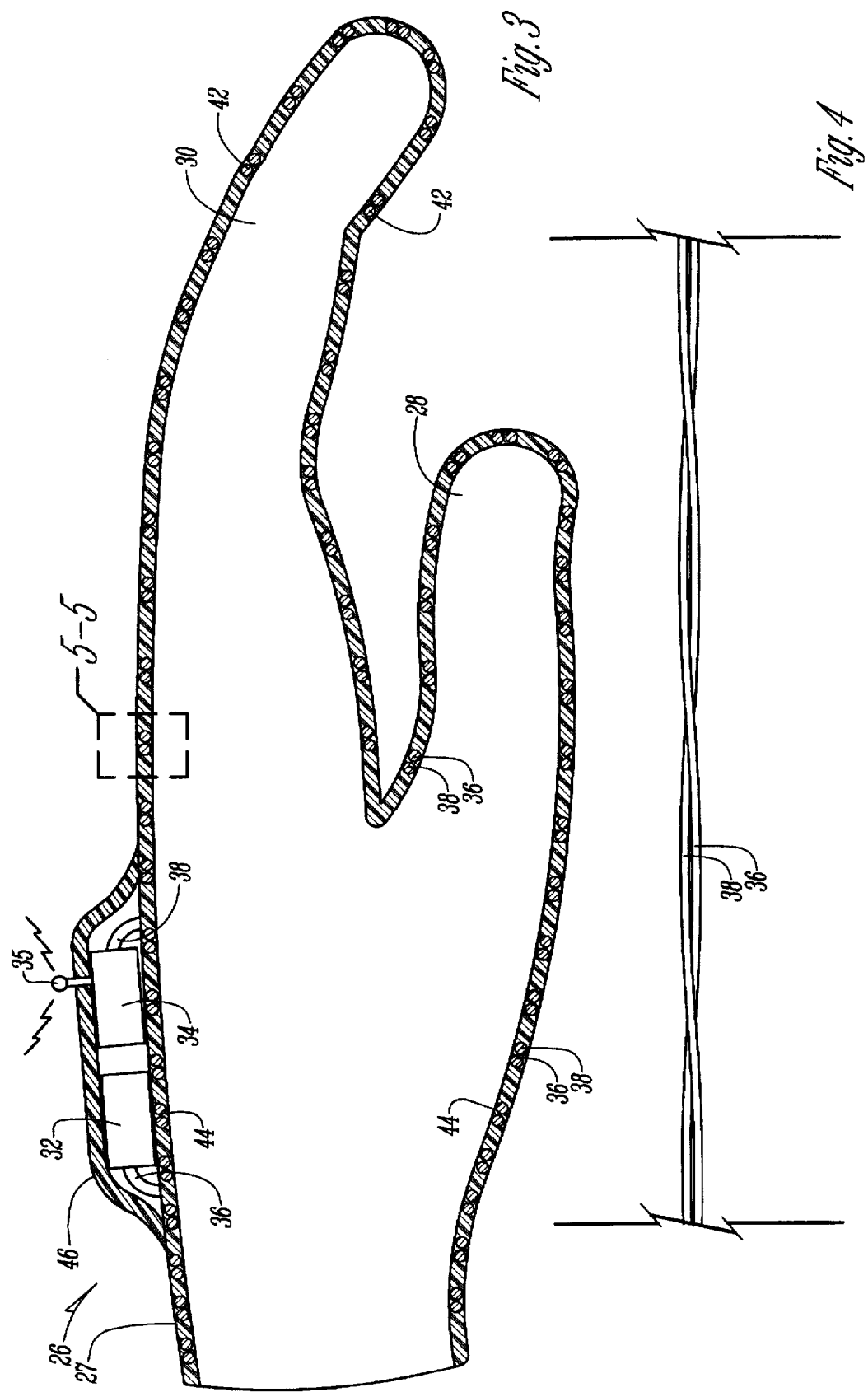

SAFETY MEANS FOR POWERED MACHINERY

BACKGROUND OF THE INVENTION

Meat skinning machines adapted to remove skin or membrane from meat, poultry or fish products have long been in existence. These machines include an elongated sharp skinning blade which is positioned adjacent a gripping roll having a plurality of teeth thereon for pulling the meat product towards the cutting edge of the blade.

Occasionally, the operators of these machines will inadvertently allow their hands or fingers to come in contact with the gripping roll whereby their hands or fingers will be drawn into contact with the skinning blade.

Various devices utilizing safety gloves with wired or wireless contact with the skinning machine have been devised. However, these devices (e.g., U.S. Pat. No. 5,148,053; 5,160,289; 5,201,684; and 5,083,973) have not been greatly accepted, primarily because of shortcomings in the safety glove.

Therefore, a principal object of this invention is to provide a safety means for powered machinery which will automatically deprive the machine of power whenever the safety glove of the operator is cut by the skinning blade.

A further object of this invention is to provide a safety means for powered machinery wherein the operator does not need to actuate a separate emergency switch to cut power to the machine.

A still further object of this invention is to provide a safety means for powered machinery wherein a wireless signal will be instantly transmitted to a receiver on the skinning machine whenever any portion of the operator's safety glove is cut by skinning blade, with the signal serving to stop the operation of the machine.

These and other objects will be apparent to those skilled in the art.

SUMMARY OF THE INVENTION

A safety glove for use with a meat cutting machine that has a gripping roll and an elongated skinning blade utilizes a glove shell having hollow thumb and finger elements, and a hand compartment. The glove is comprised of a flexible insulation material and has a battery and wireless signal transmitter mounted thereon. First and second wires extend from the battery and the transmitter and these wires are wound around each other and have a layer of insulation on the outer surfaces thereof. The wires are embedded in close proximity to each other within the glove shell by virtue of being wound around each other so that if the glove is cut with an electroconducting instrument, such as the blade of the skinning machine, the wires will be electrically connected together. This occurs either through direct contact of the wires with each other, or by contact of each wire with the skinning blade, whereby the transmitter will be energized and will transmit a wireless signal to a receiver on the machine which is programmed to immediately stop the rotation of the gripper roll. The wires are formed into a plurality of loops which extend around the thumb and finger elements as well as the hand compartment so that if any portion of the glove is cut, the closely related wires will be severed and thereby will become electrically shorted together to complete the electrical circuit to the transmitter.

BRIEF DESCRIPTION OF THE DRAWINGS

FIG. 3 is a longitudinal sectional view at an enlarged scale of the safety glove of this invention;

FIG. 4 is an enlarged scale view of the wires imbedded in the safety glove of this invention showing their interrelationship to each other;

DESCRIPTION OF THE PREFERRED EMBODIMENT

Figure 1:
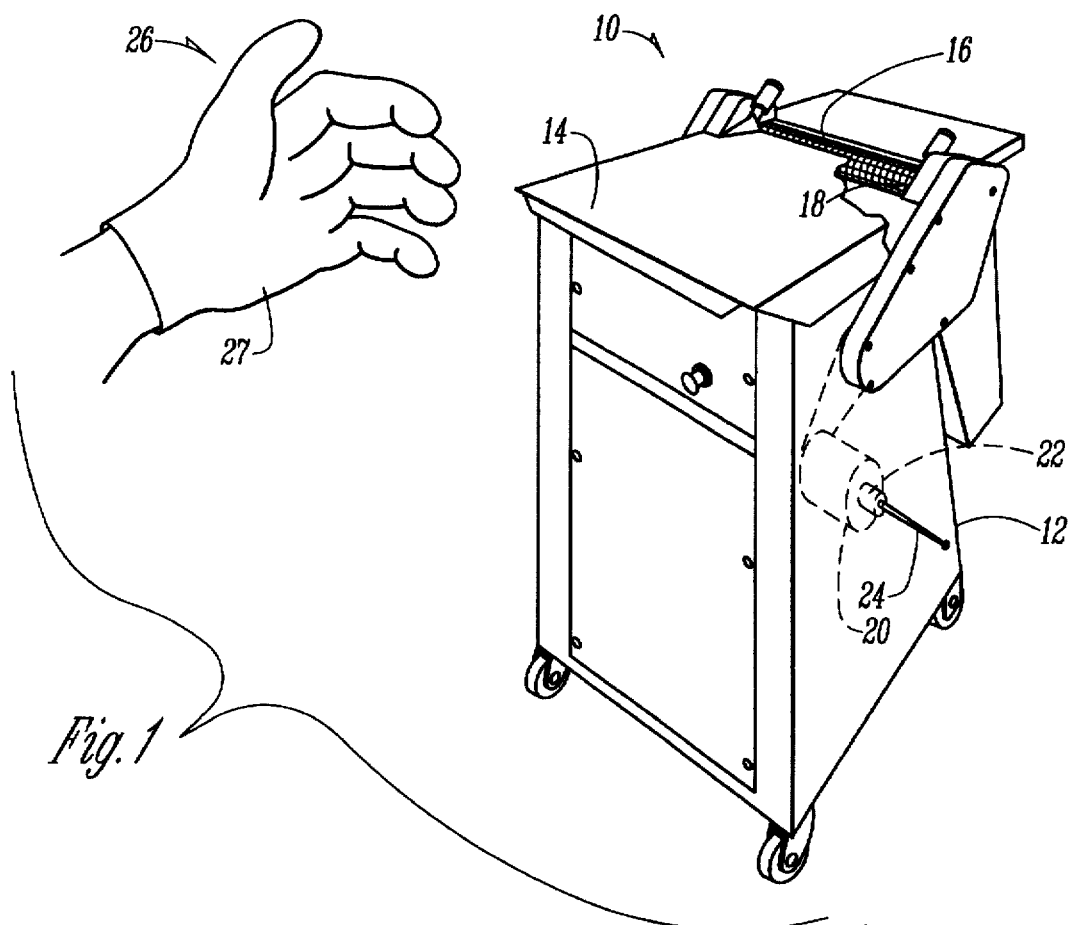
FIG. 1 is a schematic perspective view of the safety glove of this invention.
Figure 2:
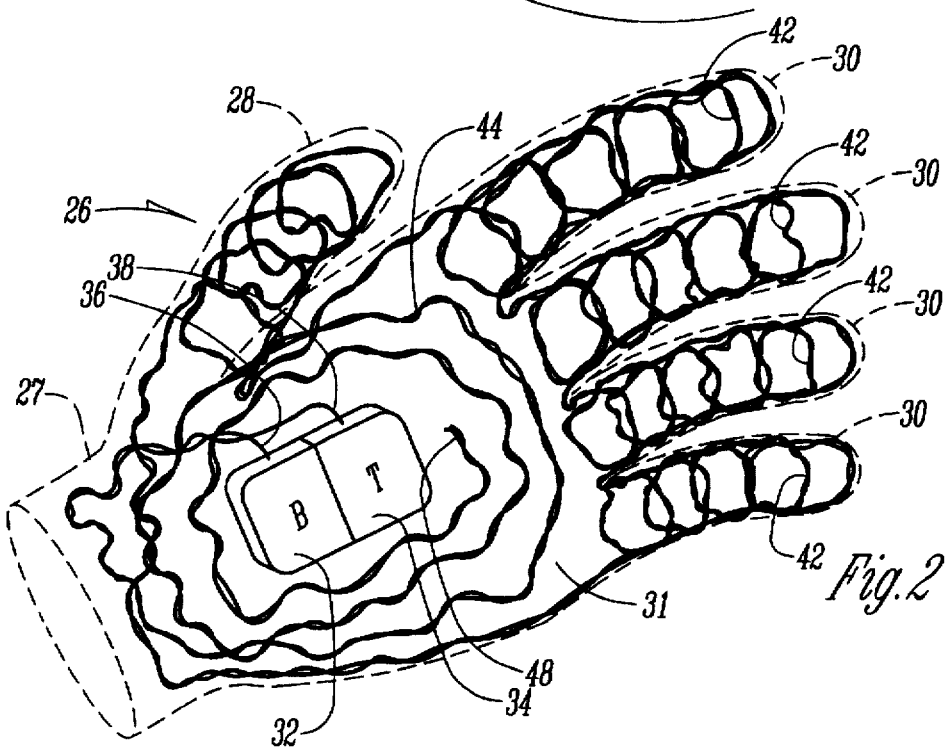
FIG. 2 is a large scale schematic view of the safety glove of this invention showing the internally imbedded wires that extend from the battery and the transmitter.

The numeral 10 designates a skinning machine which has a frame 12 and a support surface 14. An elongated sharp skinning blade 16 is mounted adjacent support surface 14 and is immediately adjacent a cylindrical gripper roll 18 which has a plurality teeth thereon and which is conventionally adapted to grip the oncoming meat product to be skinned to draw it into skinning contact with the blade 16.

The motor 20 is mounted within the frame 12 and conventionally supplies rotational motion to gripper roll 18 in any conventional fashion. Motor 20 should be a brake type motor such as that shown in U.S. Pat. No. 5,122,091 which is adapted to instantly cease rotational motion whenever power is withdrawn from the conventional windings of the motor. The description of the brake motor in said U.S. Pat. No. 5,122,091 is incorporated herein by reference and is one of several types of such motors which would be suitable for use herein.

Any suitable electronic wireless signal receiver 22 with a signal receiving aerial 24 is mounted on motor 20 and is adapted through appropriate switches to separate the windings of motor 20 from a source of electrical power whenever an incoming signal is received. Adaptations of the circuitry in U.S. Pat. No. 5,160,289 to accomplish this result are well within the knowledge and ability of persons having ordinary skill in this art.

Figure 6:
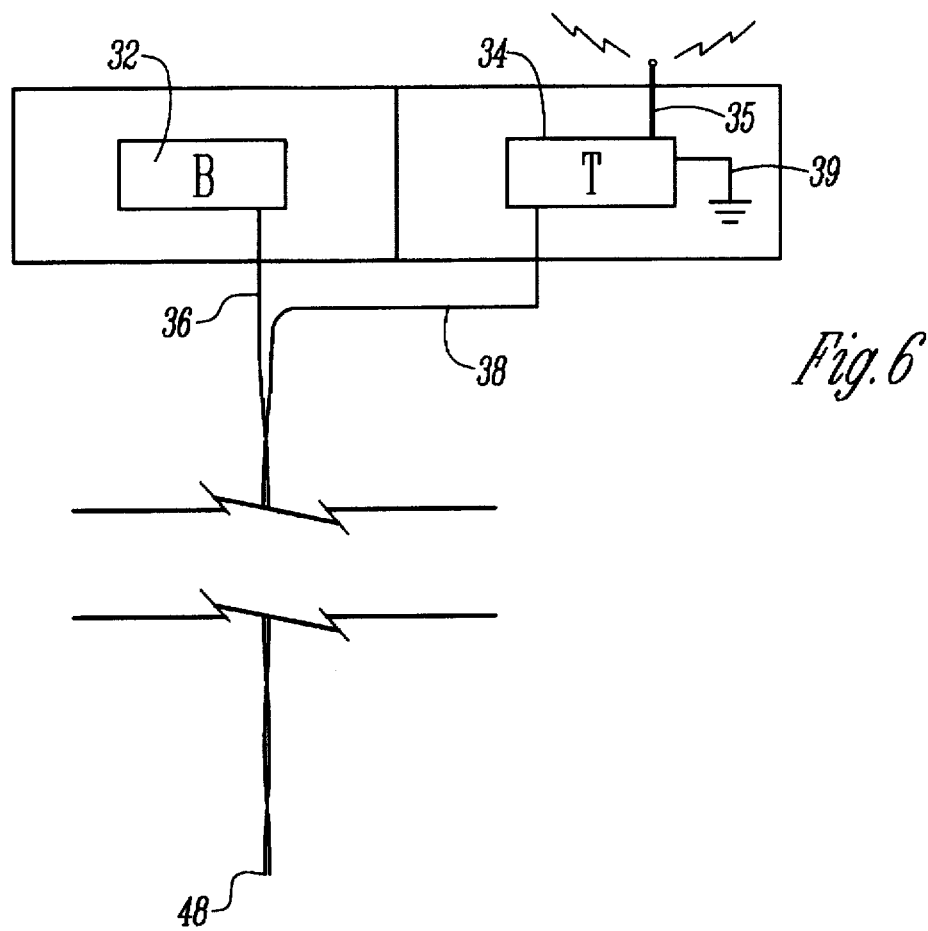
FIG. 6 is a schematic wiring diagram of the circuitry of the safety glove.
Figure 5:
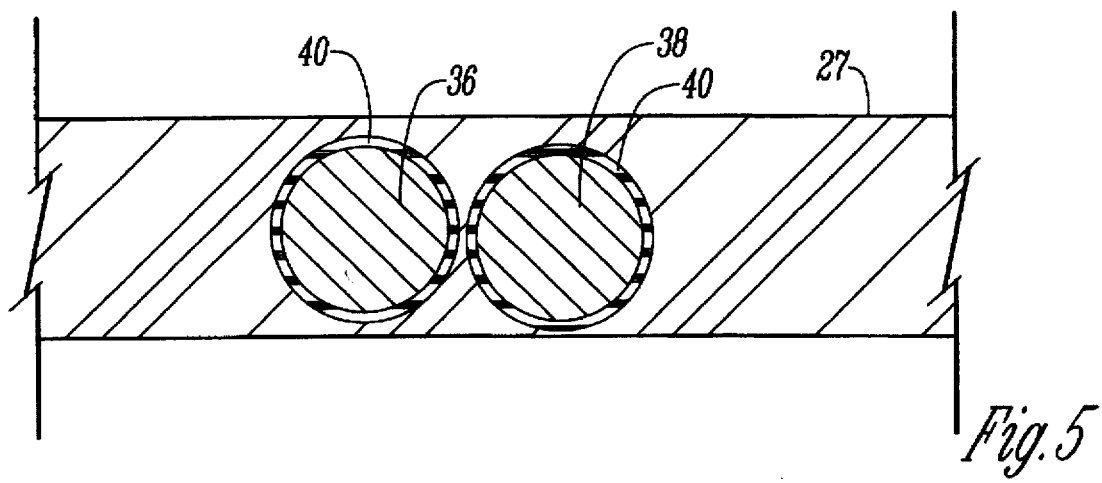
FIG. 5 is an enlarged scale sectional view taken on line 5—5 of FIG. 4.

The safety glove 26 of this invention comprises a glove shell 27 of rubber or other suitable flexible insulation material. Glove shell 27 has a hollow thumb 28 and hollow fingers 30 as well as a hand compartment 31. A conventional DC battery 32 and an electromagnetic signal transmitter 34 are mounted on the glove. Transmitter 34 has an output signal aerial 35. With reference to FIG. 6, a battery wire 36 extends from the battery 32 and is wound around a transmitter wire 38 which is operatively connected to transmitter 34. Transmitter 34 has a ground wire 39. Insulation 40 surrounds each of the wires 36 and 38 (FIG. 5).

The wires 36 and 38 are in close proximity to each other and are preferably wound around each other as shown in FIG. 4. The two wires are formed in loops 42 around the thumb and fingers of glove 26 and are imbedded within the glove shell 27 as best shown in FIG. 3. Similarly, other loops 42 extend around the hand portion or compartment 31. An insulated compartment 46 on the back of the glove 26 forms a housing for the battery 32 and the transmitter 34.

The ends of wires 36 and 38 terminate at numeral 48 and are still insulated from each other. In that normal condition, no electrical energy from battery 32 is flowing through either of the wires 36 and 38 because they are not connected to each other and there is no ground for the battery wire 36.

However, if ever the skinning blade 16 severs the glove shell 27, the closely positioned wires 36 and 38 will be severed. With reference to FIG. 5, it will be appreciated that if the wires 36 and 38 thereof are severed by the blade 16, the insulation material 60 will also be severed and the wires 36 and 38 will likely be then touching each other so that the circuit from battery 32 to transmitter 34 will be completed through the then joined wires 36 and 38, through transmitter 34 and to ground wire 39. This will cause the transmitter to emit a signal by way of aerial 35. Even if the severing of wires 36 and 38 does not short them together, they will at least be connected through the metallic conductivity of blade 16.

When receiver 22 on motor 20 receives the emitted signal from transmitter 34 as described above, by way of aerial 24, the motor 20 will be instantly stopped which in turn will cause the gripper roll 18 to instantly cease rotation. As a result, no damage or injury will continue to be inflicted on the glove 26 or the thumb or fingers within the glove by reason of the instantaneous cessation of rotational power delivered to roll 18 by motor 20.

As a result, the safety glove 26 of this invention will instantly cause the skinning machine 10 to cease to operate whenever the glove 20 comes into inadvertent contact with the blade 16 or the gripper roll 18. Accordingly, this device will achieve at least all of its stated objectives.

What is claimed is:

1. A safety glove for use with a meat cutting machine,
   a glove having a glove shell comprised of hollow thumb and finger elements, and a hand compartment,
   said glove being comprised of a flexible insulation material,
   battery and wireless signal transmitter elements on said glove,
   first and second wires extending from said battery and said signal transmitter elements, respectively,
   an insulation material on said wires,
   said wires being in close proximity to each other and extending through the material of said glove so that if said glove is cut with an electro-conducting instrument, said wires will be electrically connected together either through direct contact with each other or by contact of each wire with said instrument, whereby said signal transmitter element will be energized and will transmit a wireless signal.

2. The glove of claim 1 wherein the wires are twisted around each other.

3. The glove of claim 1 wherein the wires are formed into a plurality of loops which extend around the thumb and finger elements.

4. The glove of claim 1 wherein the wires are formed into a plurality of loops which extend around said hand compartment and the thumb and finger elements.

5. The glove of claim 3 wherein the wires are twisted around each other.

6. The glove of claim 4 wherein the wires are twisted around each other.

7. A safety means for a meat skinning machine comprising a rotationally powered gripping roll means which functions in conjunction with a cutting knife to sever the skin from a portion of meat, comprising,
   a safety glove adapted for wearing by a machine operator,
   an electrically powered skinning machine having a frame,
   a rotationally powered gripping roll means on said frame,
   a wireless electromagnetic signal receiver actuated control means on said meat skinning machine to control the rotation of said gripping roll by normally allowing rotation thereof, but stopping rotation thereof when a signal ismreceived by said signal receiver,
   a wireless electromagnetic signal transmitter connected to said safety glove,
   said safety glove being comprised of a flexible insulation material,
   battery and wireless signal transmitter elements on said glove,
   first and second wires extending from said battery and said signal transmitter elements, respectively,
   an insulation material on said wires,
   said wires being in close proximity to each other and extending through the material of said glove so that if said glove is cut with an electro-conducting instrument, said wires will be electrically connected together either through direct contact with each other or by contact of each wire with said instrument, whereby said signal transmitter element will be energized and will transmit a wireless signal to said control means.

8. A method of stopping rotation of a gripping roll on a meat skinning machine, comprising,
   placing a wireless electromagnetic receiver actuated control means on a meat skinning machine to control the rotation of said gripping roll by normally allowing rotation thereof, and stopping rotation thereof when a wireless electromagnetic signal is received,
   placing safety gloves on the hands of a machine operator, wherein said safety gloves comprise a flexible insulation material and include battery and wireless transmitter elements, first and second wires extending from said battery and said signal transmitter elements, respectively, an insulation material on said wires, said wires being in close proximity to each other and extending through the material of said glove so that if said glove is cut with an electro-conducting instrument, said wires will be electrically connected together either through direct contact with each other or by contact of each wire with said instrument, whereby said signal transmitter element will be energized and will transmit a wireless signal to said control means.

* * * * *